Patented Oct. 31, 1922.

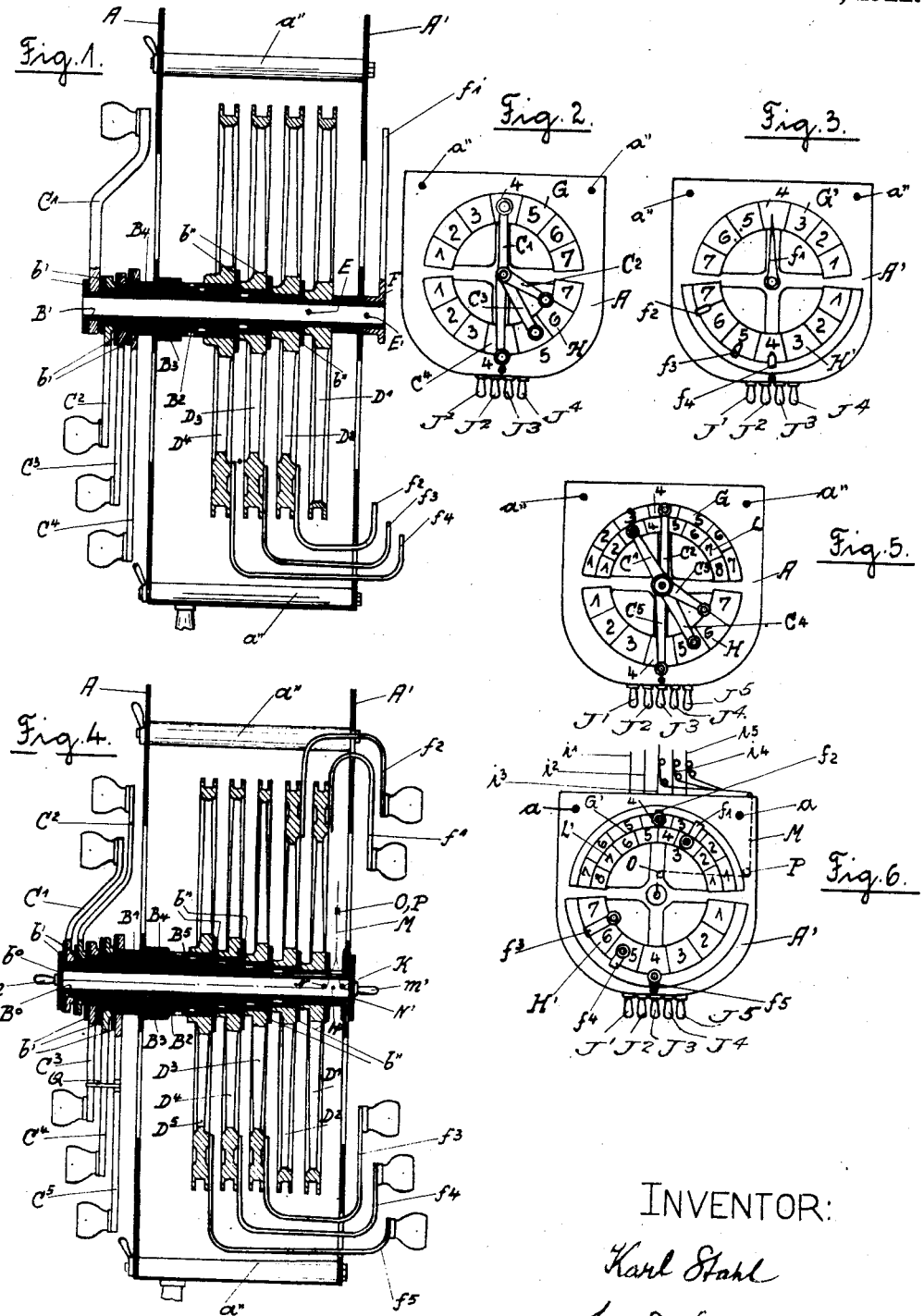

1,433,688

UNITED STATES PATENT OFFICE.

KARL STAHL, OF FRIEDRICHSHAFEN, GERMANY, ASSIGNOR TO THE FIRM LUFT-SCHIFFBAU ZEPPELIN GESELLSCHAFT MIT BESCHRANKTER HAFTUNG, OF FRIEDRICHSHAFEN, GERMANY.

COMMAND TRANSMISSION IN AIRCRAFT.

Application filed June 28, 1920. Serial No. 392,611.

*To all whom it may concern:*

Be it known that I, KARL STAHL, a citizen of the German Empire, residing at Friedrichshafen a/B., Germany, have invented certain new and useful Improvements in Command Transmission in Aircraft, of which the following is a specification.

My invention relates to an apparatus for transmitting commands and signals in particular in connection with air-craft, of the kind used, for example, as engine telegraphs on board of ships. More especially it refers to the construction of a marine engine telegraph of the kind specified adapted to act as the common main or central station for a plurality of substations, entirely independent of, i. e. having no communication with each other.

It is an object of this invention to so perfect and improve such said apparatus destined for the central station as to enable them to be put to manifold use, especially on airships and big aeroplanes. What is mainly required to accomplish this end, is least possible space and weight, absolute reliability of service, and ready accessibility to, and, renewability of the single parts.

The object specified is secured by the special structure given to the apparatus, respectively, by the peculiar arrangement of its several members.

As will be understood from the following explanation, the subject matter of this invention constitutes an apparatus for transmitting commands and signals of the kind indicated possessing only so many transmission discs, as there are substations. Each of these transmitting discs is further positively connected by means of a double rope drive with the transmission disc of the respective substation. Subject to my invention, each of the co-axial transmission discs is arranged on a special tube and terminates at either extremity of the apparatus in levers, and at the other end in indices for transmitting and receiving the signals. The apparatus may thus be operated at either end in one and the same way, and consequently forms, without embodying any increase in weight, a complete double station. This is a feature of special importance, in cases, when, as for example, in the narrow car reserved for the pilot of an airship, the pilot and his staff happen to be in the forward part of the car, while the engineer, superintending the entire engine plant, etc., along with his staff, is in the rearward part of the car; the two parts being separated from each other by a sound-damping partition. The other extremely important feature of the present invention, consists in the fact that the concentric tubes, which are adapted to mutually encompass each other, always comprise two readily detachable halves, which when fitted in place are not, however, able to execute a rotation relatively to each other. By these means, namely by simply opening the apparatus and drawing off the adjacently disposed parts, each portion of the device may be uncovered and, in case of need, renewed.

The construction will prove specially advantageous if the respective halves of the two-part tubes be adapted to interclutch at the adjoining ends, while their remote free ends are each provided with a flange. In that case, there may be attached a transmitting disc to the one of these said flanges, and a signalling lever at the other, without it therefore being necessary to make the sides of the tube very stout (so that it will become very heavy) or having to put up with an unreliable, insecure attachment of the said devices to a thin-walled tube. It will also be found that the clutch-shaped ends of the tubes may readily be so constructed that two tube sections or halves can only be so shifted into the particular position relatively to each other in which two signalling levers of a pair will come to assume their appropriate mutual position.

According to my invention the two end faces of the apparatus are provided with just as many scales or graduations as there are connected to the apparatus groups of substations of similar character, or which are adapted to be operated by the same signals, and so many signalling levers are arranged to move across these scales as will correspond to the number of substations belonging to the respective group. Moreover, in order to secure by simple means guides for these different signalling levers which will not possess any mutually disturbing action, the said levers are divided, in conformity with the two end faces of the apparatus, into two groups.

All the transmission discs are attached to the equally inclined ends of the tubes, and are adapted to support a plurality of signalling levers encompassing each other in the manner of straps, but for the rest extending toward the same side of the apparatus. The signalling levers of the other group are disposed, like the hands of a clock, on the free ends of the tubes facing the opposite side of the apparatus, and are arranged stepwise relatively to each other like the levers of the first group.

Each separate position assumed by one of these pairs of levers corresponds to a particular word of command. A signalling bell is suitably provided for each substation to announce that a command is about to be given. In order to call the attention of all the substations simultaneously to the fact that a word of command is about to be given, a combined bell-pull arrangement is branched off from the bell-signals of a group of similar substations, and this right in front of the apparatus; this combined pull arrangement, which at its end is likewise forked, is led through a stationary tube, supporting the remaining tubes, toward the two end faces of the apparatus.

Moreover, by temporarily intercoupling the signalling levers appertaining to a group of similar substations, say, by means of a clip, the signal announced may at the given moment be also simultaneously transmitted to the respective substations, whereupon the coupling is again disconnected. The possibility thus afforded of transmitting at times a joint order of command will prove especially important in cases where, say, in anticipation of an aeroplane attack, all the engines are at a given moment either to be put on for full speed ahead or astern.

Two embodiments of the subject matter of my invention are shown by way of example in the accompanying drawings, in which Fig. 1 is a vertical axial section through an apparatus connected to four stations, one side of which is adapted for receiving and transmitting signals, and the other only for receiving the same, Figs. 2 and 3 are two diagrammatic front views thereof on a smaller scale, Fig. 4 a sectional view, corresponding to that shown in Fig. 1, except that the arrangement in this case is for five stations, both sides of the apparatus being adapted for transmitting and receiving signals, there being in addition provided a combined bell-pull arrangement, Figs. 5 and 6 are two diagrammatic front views of the form of construction shown in Fig. 4, but on a smaller scale.

In the construction according to Figs. 1–3, there are disposed within a casing A—A' four tubes $B^1$, $B^2$, $B^3$, $B^4$, adapted to encompass each other. Whereas the innermost tube $B^1$ is caused to traverse the entire apparatus in the shape of a complete pipe, the outer tubes $B^2$, $B^3$, $B^4$ consist each of two parts adapted to interclutch by means of their internal ends. These two-part tubes are each provided at their two outer faces with external flanges $b'$, $b''$, while the innermost tube only possesses a single flange $b'$.

These said flanges $b'$ serve as abutments and means of attachment for one of four signalling levers $C^1$, $C^2$, $C^3$, $C^4$. In a similar manner there are connected to the flanges $b''$ of the three external tubes the transmission discs $D^2$, $D^3$, $D^4$, a similar disc $D^1$ being secured in its position relatively to the innermost tube $B^1$ by means of a pin E. The tube $B^1$, lodged beyond the disc $D^1$ in the front end $A^1$, is provided at its free end with an annular flange F terminating in an index $f'$. A pin $E^1$ serves to secure the flanged ring in its position, the said index $f'$ being disposed in the same axial plane and direction as the signalling lever $C^1$.

The transmission discs $D^2$, $D^3$, $D^4$ are each provided at their circumference with a bow shaped signalling lever $f^2$, $f^3$, $f^4$; these last-mentioned levers being likewise disposed in the like axial planes and on the same side of the tube axis as the respective signalling levers $C^2$, $C^3$, $C^4$, fixed each at the opposite end of the tube. Wires, not shown in the drawing, are caused to run upwards from the transmission discs $D^1$, $D^2$, $D^3$, $D^4$ to four simple substations containing each but a single transmission disc.

Let it now be assumed that the transmission disc $D^1$ serves as a means of connection of the apparatus to a fighting station, and that the three transmission discs $D^2$, $D^3$, $D^4$ serve to transmit commands to three similar engine stations, of which always one is located in the cars located respectively in the centre at larboard, and at starboard. In accordance herewith, there are arranged at the front ends A and $A^1$ of the casing, always two scales, G and H, and $G^1$ and $H^1$, respectively; the scales G, $G^1$ disposed above the tube axis embodying a division into commands for the fighting station, and the scales H, $H^1$, disposed below the tube axis, a uniform division of commands for the engine stations. For clearness sake, merely the spaces in which the words of command are to be inscribed are indicated in the drawing, but not the words themselves.

To prevent their mutually interfering with each other, the signalling levers $C^2$, $C^3$, $C^4$ and $f^2$, $f^3$, $f^4$, respectively, are arranged stepwise. Since, moreover, only one side of the apparatus is intended to be used for transmitting, only the signalling levers $C^1$, $C^2$, $C^3$, $C^4$ are provided with appropriate handles.

In order to notify the respective branch station that a command is about to be transmitted, there are provided four bell-pulls, which on being drawn will cause a bell to ring at the station desired. With the view to rendering the drawing as clear as possible, there are only indicated thereon the ends $J^1$, $J^2$, $J^3$, $J^4$ of the bell-pulls, which, however, are not in communication with the transmission discs.

The signalling levers are adapted to freely move across their respective scales, since the single tubes $B^1$, $B^2$, $B^3$, $B^4$, are disposed freely to rotate, though not to shift, relatively to each other. On it being desired to take the apparatus apart, all that is required is to unscrew the screw bolts $a''$ uniting the front faces A, $A^1$, as also to remove pins E and $E^1$, whereupon, by merely drawing the several members apart, the connection may be readily severed at any point desired, and subsequently be re-established by simply putting the parts together again.

The apparatus shown in Figs. 4–6 is essentially constructed along the same lines as that hereinbefore described however, it yet embodies certain additional improvements.

The casing A, $A^1$ is adapted to accommodate a stationary through-going tube $B^0$, the one end of which is closed by a bottom $b^0$. The open end of said tube is disposed within a casing K fixed to the end face $A^1$, and secured by a pin $K^1$ against rotation or shifting. Similar to the previously shown arrangement, there are rotatably disposed on the through-going tube $B^0$ two-part tubes $B^1$ to $B^5$ provided at either of their sides with flanges $b'$ and $b''$, respectively. The flanges $b'$ are adapted to support each one of five signalling levers $C^1$ to $C^5$, fixed in the manner of an index or clock hand. To the flanges $b''$ there are connected five transmission discs $D^1$ to $D^5$, each at its circumference being provided with a bow-shaped signalling lever $f^1$ to $f^5$.

As in the previous instance, it shall here also be assumed that the disc $D^1$ serves for establishing the communication with a fighting station, and the discs $D^3$, $D^4$, $D^5$ for transmitting commands to a respective engine station. The disc $D^2$ is intended to establish communication with the radio-telegraphic station of the airship. In accordance with this arrangement, the front ends A, $A'$ of the casing are provided at their lower section each with a scale H and $H'$, respectively, embodying the division into the commands for the three similar engine stations. The signalling levers $C^3$, $C^4$, $C^5$ and $f^3$, $f^4$, $f^5$, moving across these scales and arranged stepwise, are each provided with a handle. Above the common axis of rotation there are provided on each of the front faces of the casing two concentric scales G and L, and $G'$ and $L'$, respectively, embodying divisions for the fighting and the radio-telegraphic stations.

Of the pairs of signalling levers $C^1$, $f^1$ and $C^2$, $f^2$, which are likewise arranged stepwise and provided at either side with handles, the former is adapted to move across scales L and $L'$, and the latter across scales G and $G'$.

Besides the five single bell pulls denoted by the letters $i^1$ to $i^5$ in Fig. 6 and having handles $J'$ to $J^5$ attached to them there is in addition arranged for the three engine stations a combined bell-pull device.

A wire M connected above the apparatus (Fig. 6) to the three respective single bell-pulls, $i^3$, $i^4$, $i^5$, is forked at its lower end (Fig. 4) and runs through an opening in the tube $B^0$, and cap K into the interior of the tube and thence to two hand grips $m$, $m'$ arranged at the front ends of the casing. Deflection rollers N, $N'$, disposed within the interior of the tube, as also two deflection rollers O, P, arranged outside the tube at the front wall $A'$ of the casing, tend to prevent the combined bell-pull from disturbing the motion of the rotating tubes $B^1$ to $B^5$, as well as that of the signalling levers $C^1$ to $C^5$ etc.

In order to be able, in case of requirement, to transmit a joint command to the three engine stations by the movement of but a single signalling lever, the lever $C^5$ is adapted to support a strap Q, which may be turned back, and which, when so turned, will with its shanks embrace the signalling levers $C^3$ and $C^4$ in the manner of a clamp. Given a suitable internal diameter for the innermost tube $B^0$, the strap Q may be positively connected to a strap provided for the signalling levers $f^2$, $f^3$, $f^4$, thus rendering it possible to couple to or else release the three sets of levers from the one or the other side of the apparatus, and entirely at will. Besides, if required, even more than three groups may be connected to one apparatus, each embodying a plurality of similar substations. And in a like way, the number of combined bell-pull arrangements may be increased.

It is now intended to illustrate the manner of operation of the apparatus by aid of two examples.

Let it be assumed that from the apparatus of the main station (Figs. 1–3), signals are to be transmitted to simple substations arranged at the larboard and starboard cars, as also at the fighting point. Each of the apparatus of these three substations, and which contain only a single transmission disc, is positively connected to one of three transmission discs $D^3$ (larboard), $D^4$ (starboard) and $D^1$ (fighting point) of the apparatus belonging to the main station. At the commandant's side of the main station (looking to the left in Fig. 1), and after preliminary ringing of bells $J^3$, $J^4$ and $J^1$, which constitutes in each case the call signal for the respective substation, the signalling levers $C^3$, $C^4$ and $C^1$ are set to the commands required, say, for example, larboard engine: "Slow ahead!" (lower field 5), starboard engine: "Stop!" (lower field 4), fighting station: "Ready to cast!" (upper field 4). Fig. 2 illustrates this position. At the substations called up, of which each merely possesses a single scale and a single signalling lever, the latter will set itself to the like command owing to the positive transmission effected. At the engineer's end of the apparatus belonging to the main station (looking to the right in Figs. 1 and 3) the signalling levers $f^3$, $f^4$ and $f^1$ move across the respective commands. Figs. 2 and 3 show these levers in the positions just mentioned. Now while the commanding officer has issued the above commands in immediate succession, the engine of the central car has suffered an accident. The mechanic will then report this by giving a bell signal, and thereupon shifting the signalling lever of his station on to the division between fields 6 and 7. By means of the transmission disc $D^2$ of the main station, the signalling levers $C^2$ and $f^2$ of this latter will be shifted on to the division between the lower fields 6 and 7 (Figs. 2 and 3), so that both commandant and engineer will be simultaneously informed of the accident. Since each of the transmission discs $D^1$ to $D^4$ merely serves to establish the communication with one of the substations, and as moreover the discs $D^1$ to $D^4$ may be rotated independently of each other, none of the substations will be liable to interfere with the connection established between the main station and one of the substations. It is obvious, that owing to the positive connection existing between main station and substation, different signals cannot be exchanged at a time on both sides of the same line. For the rest, of course, there is no objection to transmitting signals to different substations at one and the same time. All that is required is for the commandant to simultaneously shift (at different or at the same point of the apparatus) different signalling levers C.

The manifold ways in which a main apparatus constructed along the lines laid down in Figs. 4 to 6 may be employed, will become apparent from the following example.

The apparatus is connected by means of its five transmission discs $D^1$ to $D^5$ with a fighting station ($D^1$), a radio-telegraphic station ($D^2$), a larboard station ($D^3$), a starboard station ($D^4$), and a station in the car at the stern ($D^5$). After having rung the signals $J^1$, $J^4$, $J^5$, the commandant shifts the signalling lever $C'$, on to the upper field 3 (fighting station: cast bombs!), $C^4$ on to the lower field 5 (starboard—steam slow ahead!), and $C^5$ on to the lower field 4 (stern engine stop!). Simultaneously, the engineer in the rear end of the forward car, which is separated by a partition from the commandant's end, by shifting the signalling lever $f^2$ on to the upper field 4, issues the order to the radio-telegraphic station ("Draw in antenna!"). On the other hand, the transmission disc $D^3$ rotates, in consequence of long-distance action effected at the larboard station, and, by the shifting of the signalling levers $C^3$ and $f^3$ onto the division marked between fields 6 and 7 on the respective scales, indicates that the larboard engine has sustained an accident. Now since the commandant has before him the left front face of the apparatus (as shown in Fig. 4) and the engineer the right hand face thereof, each of the two officers will be able to read at a glance the orders issued by the other, as also the signals arriving from the substations. As Fig. 4 shows, the apparatus may be operated in entirely the same manner from either end by actuating the appropriate levers $C$ and $f$, respectively. As each of the levers C, along with its respective lever $f$ is rigidly connected to one of the transmission discs D, it is obvious that shifting a lever at one end will simultaneously cause the corresponding lever at the other side of the apparatus, as well as the lever at the respective substation, to be shifted, and vice versa.

It is further understood that in the place of the bell-pull arrangement as hereinbefore described, also signalling arrangements of any other kind whatsoever may be employed.

I claim:

1. In a device of the kind described in combination, a plurality of transmission discs and of concentric tubular disc carriers, each carrying one disc, a signal lever fixed to one end of each carrier and a pointer fixed to the free end of the innermost carrier.

2. In a device of the kind described in combination, a plurality of transmission discs and of concentric tubular disc carriers, each carrying one disc, a signal lever fixed to one end of each carrier, a pointer fixed to the free end of the innermost carrier and bent signal levers extending from the peripheries of discs disposed on other carriers.

3. In a device of the kind described in combination, a plurality of transmission discs and of concentric tubular disc carriers, each carrying one disc and being formed in two halves adapted to be easily disengaged from one another.

4. In a device of the kind described in combination, a plurality of transmission discs and of concentric tubular disc carriers, each carrying one disc, a signal lever fixed to one end of each carrier, a plurality of scales on either face of said device, the number of scales on each face equalling the number of groups of identical substation connected thereto, and a plurality of independent pointers operatively connected with said carriers and discs, respectively, and adapted to move in front of said scales, the number of pointers apportioned to each scale equalling the number of identical substations in the group corresponding to said scale.

5. In a device of the kind described in combination, a plurality of transmission discs and of concentric tubular disc carriers, each carrying one disc, a signal lever fixed to one end of each carrier, bent signal levers extending from the peripheries of some discs and means for temporarily serving the connection between signal levers of the first and second group, respectively.

6. In a device of the kind described in combination, a plurality of transmission discs and of concentric tubular disc carriers, each carrying one disc and bent signal levers extending from the peripheries of some discs, said carriers being formed in two halves adapted to be easily disengaged from one another, a signal lever being fixed to one half and a disc to the other half.

7. In a device of the kind described in combination, a plurality of transmission discs and of concentric tubular disc carriers, each carrying one disc, a signal lever fixed to one end of each carrier and a movable strap connected with one of said levers and adapted, on being turned, to embrace other levers belonging to the same group.

8. In a device of the kind described in combination, a plurality of transmission discs and of concentric tubular disc carriers, each carrying one disc, a signal lever fixed to one end of each carrier the innermost carrier being immovably fixed in position and a pair of bell pulls extending in either direction through said innermost carrier and leading to all identical substations belonging to a group.

In testimony whereof I affix my signature.

KARL STAHL.